Feb. 6, 1923.                                                                                          1,444,399
B. H. SHERWOOD
LUBRICATING DEVICE
Filed Nov. 17, 1921

Patented Feb. 6, 1923.

1,444,399

UNITED STATES PATENT OFFICE.

BERNARD H. SHERWOOD, OF WORCESTER, MASSACHUSETTS.

LUBRICATING DEVICE.

Application filed November 17, 1921. Serial No. 515,791.

*To all whom it may concern:*

Be it known that I, BERNARD H. SHERWOOD, a citizen of the United States, residing at Worcester, in the county of Worcester and State of Massachusetts, have invented new and useful Improvements in Lubricating Devices, of which the following is a specification.

This invention relates to a lubricating device and has for its object to provide a mechanism which may be employed in connection with bearings of various types for the purpose of positively forcing the lubricating oil to the bearing surfaces thereof.

It is still further an object of the invention to so construct the device that it may also be employed in removing from the bearing grease which has become impregnated with dirt.

The invention consists in the combination and arrangement of parts set forth in the following specification and particularly pointed out in the claims thereof.

Referring to the drawings.

Like numerals refer to like parts throughout the several views of the drawings.

Figure 1:
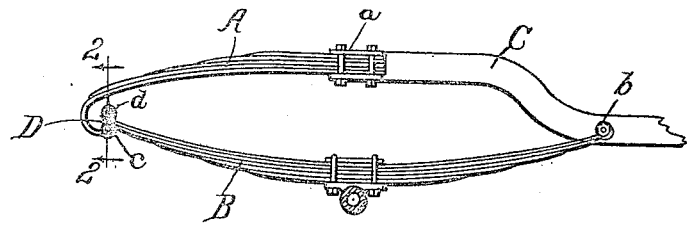
Figure 1 represents a side elevation of an automobile spring of well known type, the same being equipped with a plurality of lubricating devices embodying my invention.

In the drawings, A and B represent the members of a vehicle spring of well known type, and C a portion of a vehicle frame to which said members A and B are attached at *a* and *b* respectively in a manner well known to those skilled in the art, while adjacent end portions *c* and *d* of the members A and B are secured together through the medium of a shackle D. The shackle D comprises a pair of side plates 5 between which extend bolts 6, and the end portions *c* and *d* of the spring members A and B respectively are mounted upon said bolts 6 in the usual well known manner. The bolts 6 each embody therein a main body portion 7 constituting a bearing member having a head 8 formed integral therewith at one end thereof, while at its other end a nut 9 has screw-threaded engagement therewith.

Figure 2:
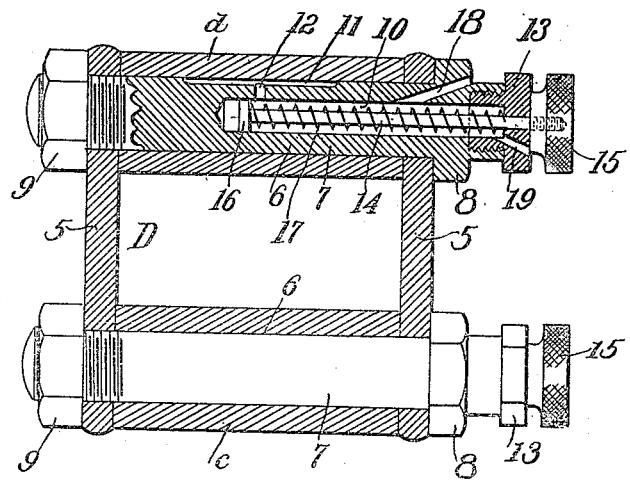
Fig. 2 is a vertical section partly in elevation taken on the line 2—2 of Fig. 1 and illustrating the manner of employing a lubricating device embodying the invention upon a spring shackle.

The foregoing parts are all old and well known in the art, the present invention residing in a new and improved mechanism for lubricating the adjacent surfaces of the bolts 6 and the ends of the spring members mounted thereon. Extending partly through the bolt 6 from one end thereof is a cylindrical passage 10. Upon the periphery of the bolt 6 a suitable oil channel 11 is formed which is connected by a passage 12 with the cylindrical passage 10. A hollow screw plug 13 has screw-threaded engagement with the end of the bolt 6 thereby closing the outer end of the passage 10 and forming a bearing for a plunger rod 14. A handle 15 is secured to the plunger rod 14 at its outer end, while upon the inner end thereof a plunger 16 is provided which has sliding engagement with the wall of the passage 10. A spring 17 surrounds the rod 14, one end of said spring engaging the plunger 16 and the other end engages the screw plug 13, thereby normally holding the plunger in the position illustrated in Fig. 2 with the handle 15 abutting against the screw plug 13. A passage 18 constituting an oil inlet extends through the head 8 of the bolt 6 and connects with the passage 10, while another passage 19 extends through the screw plug 13 and connects with the passage 10 and constitutes a discharge passage for old grease which has become mixed with dirt and which may have oozed from the oil channel 11 through the passage 12 into the passage 10.

The general operation of the device is as follows:—When it is desired to lubricate the adjacent surfaces of the bolt 6 and spring member mounted thereon the handle 15 is pulled outwardly until the plunger 16 has passed beyond the inner end of the inlet passage 18. Lubricating oil is then inserted into the passage 18 and said oil flows downwardly through said passage into the passage 10 in front of the plunger 16. When sufficient oil has been inserted, the handle 15 is released, and the spring 17 then forces the plunger 16 forwardly in the passage 10 and positively forces the oil outwardly through the passage 12 into the oil channel 11 from which it gradually oozes around the periphery of the bolt. During the subsequent use of the device, if oil with dirt mixed therewith oozes inwardly through the passage 12 into the passage 10 at the rear of the plunger 16 this old grease will be forced rearwardly by the plunger when the latter is again pulled outwardly for the purpose of inserting a fresh supply of oil and will ultimately be forced outwardly through the discharge passage 19. The plunger, therefore, serves in the double capacity of forcing the fresh oil inwardly and forcing the old grease outwardly.

Lubricating devices embodying this invention are particularly effective in cold weather when the oil does not flow freely or when a particularly heavy oil is utilized.

It is evident that the device may be employed in different types of bearings and in connection with shafts or studs, or any other members upon which another member is adapted to rotate, or have a bearing, or upon which another member requiring lubricaton is mounted.

I claim:

1. In combination, a bearing member provided with a cylindrical bore having an oil inlet and an oil discharge passage communicating therewith, said bore also communicating with the periphery of said bearing member, a screw plug closing the entrance to said bore, a rod slidably mounted in said screw plug, a plunger fast to said rod and located within said bore and a spring surrounding said rod and forcing said plunger and rod inwardly within said bore, said plunger during its outward movement being adapted to force grease located within said bore at the rear of said plunger outwardly through said discharge passage.

2. In combination, a bearing member provided with a cylindrical bore having an oil inlet and an oil discharge passage communicating therewith, said bore also communicating with the periphery of said bearing member, a screw plug closing the entrance to said bore, a rod slidably mounted in said screw plug, a plunger fast to said rod and located within said bore, a spring surrounding said rod and forcing said plunger and rod inwardly within said bore and a handle fast at the outer end of said rod whereby said plunger may be pulled outwardly and grease within said bore may be forced outwardly through said discharge passage.

3. A spring shackle comprising a pair of side plates, bolts mounted in said side plates and having the ends of leaf springs mounted thereon, each bolt being provided with a bore therein communicating with the periphery thereof, said bolt also being provided with an inlet passage communicating with said bore, a screw plug located at the outer end of said bolt and having a discharge passage communicating with said bore, a rod slidably mounted in said screw plug, a plunger fast to said rod and located within said bore and a spring surrounding said rod and normally forcing said plunger and rod inwardly within said bore, said plunger being adapted to force grease located within said bore at the rear of said plunger outwardly through said discharge passage.

In testimony whereof I have hereunto set my hand in presence of two subscribing witnesses.

BERNARD H. SHERWOOD.

Witnesses:
 FRANKLIN E. LOW,
 HAZEL F. LA MUDGE.